United States Patent [19]

Cox

[11] Patent Number: 5,170,440
[45] Date of Patent: Dec. 8, 1992

[54] PERCEPTUAL GROUPING BY MULTIPLE HYPOTHESIS PROBABILISTIC DATA ASSOCIATION

[75] Inventor: Ingemar J. Cox, Lawrenceville, N.J.
[73] Assignee: NEC Research Institute, Inc.
[21] Appl. No.: 647,783
[22] Filed: Jan. 30, 1991
[51] Int. Cl.$^5$ ............................................. G06K 9/48
[52] U.S. Cl. .................................. 382/22; 382/14; 382/39; 395/143
[58] Field of Search ............... 382/22, 14, 15, 39, 382/41; 364/513, 518; 395/20, 21, 61, 100, 118, 129, 142, 143

[56] References Cited

U.S. PATENT DOCUMENTS

| | | | |
|---|---|---|---|
| 2,978,675 | 4/1961 | Highleyman | 382/39 |
| 3,845,466 | 10/1974 | Hong | 382/39 |
| 4,361,830 | 11/1982 | Honma et al. | 382/22 |
| 4,748,675 | 5/1988 | Suzuki et al. | 382/14 |
| 4,916,745 | 4/1990 | Hart et al. | 382/39 |
| 5,018,216 | 5/1991 | Kojima | 382/22 |
| 5,018,217 | 5/1991 | Yoshida et al. | 382/22 |
| 5,040,133 | 8/1991 | Feintuch et al. | 364/518 |
| 5,060,277 | 10/1991 | Bokser | 382/14 |

OTHER PUBLICATIONS

Ayache et al., "Maintaining Representations at the Environment of a Mobile Robot", *IEEE Trans. Robotics and Automation*, 5(6), 1989, pp. 205–219.

Chong et al., "*Multitarget-Multisensor Tracking:Advanced Applications*", Artech House, 1990, pp. 247–295.

Reid, "An Algorithm for Tracking Multiple Targets", *IEEE Trans. on Automatic Control*, A(.24(6) Dec. 1979, pp. 843–854.

*Primary Examiner*—Joseph Mancuso
*Attorney, Agent, or Firm*—A. J. Torsiglieri

[57] ABSTRACT

Computer vision algorithms for detecting contours or localized regions of prescribed intensity distributions in an image scene utilizing multiple hypothesis probabilistic data association techniques to overcome the effect of noise or false readings.

2 Claims, 7 Drawing Sheets

114 column number → 127

PERCEPTUAL GROUPING BY MULTIPLE HYPOTHESIS PROBABILISTIC DATA ASSOCIATION

FIELD OF INVENTION

This invention relates to computer vision and more particularly to the use of a computer to process a pictorial image into a signal more amendable for some intended purpose, such as object recognition.

BACKGROUND OF THE INVENTION

Known schemes for computer processing a given pictorial image into a more amendable form typically depends on recognizing the boundaries or contours of important objects in the image, since boundaries of objects are usually an important intermediate representation in going from initial intensity data to final interpretation of the image. Object boundaries are often identified by significant changes in intensity over some small neighborhood and so edge detection attempts to identify pixels in the image where there is a large intensity gradient. However, edge detectors do not group individual edge elements (edgels) together to form contours. This is left to a further level of processing.

Associating edge points with a contour is difficult because the input data is noisy, there may be false and/or missing measurements, there are ambiguities because, for example, in an image contours may intersect and interfere with one another, the number of perceptually relevant groupings is unknown before hand and may change with time, some groups unexpectedly terminating and others being created. The correspondence problem (or data association problem) is what makes perception different from traditional estimation and control problems. The fundamental problem is that we have both uncertainty in the origins of measurements as well as in the values of the measurements.

The Hough transform is probably the most popular algorithm for detecting lines. However, it does not explicitly indicate the start and end points of the line segment. Moreover, choosing the size of the accumulator array can be problematic. Most importantly, the Hough transform is only appropriate when the general shape of the contour, e.g. straight line, circle etc., is known. It is not appropriate for linking edgels to form arbitrary contours.

Edge following as graph search has some similarities to the algorithm proposed hereinafter, particularly in its need to search trees. However, measurement noise, e.g. errors in the location of edgels, is not explicitly modeled, nor is there any attempt to estimate the likelihood of a particular contour given the measurement and data association uncertainties.

SUMMARY OF THE INVENTION

In one aspect, the invention may be viewed as: a computer vision process for partitioning an image scene into disjoint sets of points based on a method of probabilistic data association, particularly, a computer vision process for finding at least one contour in an image scene comprising the steps of storing a frame of an image scene, analyzing said frame by an edge detection process for delineating discrete areas of said image scene that include contours to be detected, scanning a local neighborhood of said discrete area (say a line at a time) for observing edgels in said neighborhood, matching the observed edgels for a neighborhood with predicted edgels for said neighborhood for developing a hypothesis matrix for a contour based on edgels observed or predicted for that neighborhood, said predicted edgels being based on earlier observed and predicted values, assigning newly observed edgels in said hypothesis matrix to contours, generating data association hypotheses based on the hypothesis matrix, providing probability statistics to each hypothesis generated, summing the probability statistics of each hypothesis and discarding hypotheses with relatively low probability statistics and saving for utilization and for storage the hypotheses with relatively high probability statistics, reducing the total number of hypotheses by partitioning the hypotheses tree into spatially disjoint tree, utilizing the saved hypotheses for generating predicted edgels for the next neighborhood for use in the earlier-mentioned matching. When the image scene is first processed by an edge detector as in this aspect, then the algorithm partitions edge points into disjoint sets, each set representing a contour in the image scene. In another aspect, the invention may be viewed as: a computer vision process for partitioning an image scene into disjoint sets of points based on a method of probabilistic data association, particularly, a computer vision process for segmenting an image into at least one spatially disjoint region, comprising the steps of storing a frame of an image scene, scanning a local neighborhood of said scene (say a line at a time) for observing pixels in said neighborhood, matching the observed pixels for a neighborhood with predicted pixel values for said neighborhood for developing a hypothesis matrix for a region based on pixels observed or predicted for that neighborhood, said predicted pixels being based on earlier observed and predicted values, assigning newly observed pixels in said hypothesis matrix to regions, generating data association hypotheses based on the hypothesis matrix, providing probability statistics to each hypothesis generated, summing the probability statistics of each hypothesis and discarding hypotheses with relatively low probability statistics and saving for utilization and for storage the hypotheses with relatively high probability statistics, reducing the total number of hypotheses by partitioning the hypotheses tree into spatially disjoint trees, utilizing the saved hypotheses for generating predicted pixel values for the next neighborhood for use in the earlier-mentioned matching.

If the image is processed directly by the algorithm as in the second aspect, the intensity points are partitioned into disjoint sets, each set representing constant intensity, linearly increasing intensity, etc. The method therefore segments the image into distinct, closed regions.

In both aspects, a common feature is the use of probabilistic data association either to partition edge points into disjoint sets, each representing a contour in the image scene or to partition discrete intensity points into disjoint regions of constant or prescribed variation, intensity.

It will be desirable to discuss the invention with a particular emphasis on the first aspect which is believed more amenable to simple exposition.

As a basis of the present invention, linking edgels to form contours is examined as a problem in probabilistic data association and employs an approach previously suggested for multi-target tracking. The proposed algorithm is capable of initiating and of terminating contours and accounting for missing or false measurements. As new measurements are obtained and ambiguities arise, a hypothesis tree is grown, each hypothesis representing one possible set of data associations (did the measurement originate from a known contour or is it the start of new contour or a false alarm) and the probability of the hypothesis is calculated. As new measurements are obtained, the probability of joint hypotheses are calculated recursively using information such as density of unknown contours, density of false alarms, probability of detection of a contour and measurement location uncertainty. Ideally, if a complete Bayesian hypothesis tree could be grown, then the leaf with the largest probability would represent the most likely set of data associations, i.e. grouping of edge elements into contours. However, the Bayesian hypothesis tree grows expontentially with the number of measurements, so, in practice, the tree must be pruned. This is done by pruning branches of the tree that have low probability and by partitioning the single global hypothesis tree into spatially disjoint trees.

Thereafter the "multiple hypothesis tracking" (MHT) filter can be used to extract contours from an image. The MHT technique was first proposed in a paper entitled "An algorithm for tracking multiple targets" IEEE Transactions on Automatic Control, AC-24(6) December 1979. MHT techniques provide a powerful formalism for addressing the correspondence problem and ambiguities that may arise at any time in the interpretation of an edge measurement. The appeal of MHT techniques is that they can refrain from making irreversible decisions too early in the interpretation process:

The multiple hypothesis approach makes 'soft' data association decisions when the available data are not of high enough quality. Instead of making firm commitments of associating measurements to tracks, it forms multiple data association hypotheses corresponding to alternate explanations of the origins of the measurements. These hypotheses are evaluated with respect to their probabilities of being true using the target and sensor models, as discussed in a book entitled "Multitarget-Multisensor Tracking: Advanced Applications" pages 247-295 Artech House (1990).

BRIEF DESCRIPTION OF THE DRAWING

The invention will be better understood from the following more detailed description taken in conjunction with the accompanying drawing in which FIG. 1 may be viewed alternatively either as a block schematic of equipment for carrying out the algorithm of the invention or as a flow chart of the steps in the algorithm of the invention carried out in a programmed computer.

DETAILED DESCRIPTION OF THE INVENTION

Before discussing in detail an embodiment of the invention, it will be helpful first to discuss some basic principles important to the invention.

The multiple hypothesis filter was originally developed for the purpose of target tracking, in particular, for the tracking of multiple targets in a clutter, i.e. noise, false alarms, missing measurements etc.

Tracking requires an independent temporal variable which does not naturally exist in a static (single frame) image. For the invention assume an ordering of the image, e.g. it is processed a row or column at a time. In fact, there are any number of ways of ordering the pixels in an image. The only important property of such an ordering is that we should be able to conveniently predict the position of measurements in the next set, given our current hypothesized partitioning. This implies that the ordering thereof has some spatial continuity.

If we make an analogy to the tracking literature we then have that a target is a edgel, extracted from an image by application of an edge detector; a track is a sequence from one row to the next, of corresponding edgels, i.e. a track is a contour. A global hypothesis is one possible interpretation of the image together with an associated probability of the hypothesis given all past (previous rows) and current measurements (edgels in the current row). An hypothesis consists of a set of contours, each of which has spatial (position) and gradient attributes with corresponding uncertainties represented by traditional covariances. The grouping together of contours into higher level objects is not currently considered but techniques for this are available to workers in the art.

At row k we have a set of association hypotheses (models) $\Omega^k$ obtained from the set of hypotheses $\Omega^{k-1}$ at row k-1 and the latest set of measurements from row k $$Z(k) \stackrel{\Delta}{=} \{z_i(k)\}_{i=1}^{m_k} \quad (1)$$

where $m_k$ is the number of measurements $z_i(k)$ at row interval k. An association hypothesis is one possible interpretation of the current row's edgels. Since at any one row it is very likely that there will be some ambiguity to the interpretation of edgels, there can be many association hypotheses. The multiple hypothesis filter allows the assignment of a probability value to each of these hypotheses.

More formally, an association hypothesis groups the history of measurements into partitions such that $Z^{k,t} = \{z_{i1,t}(1), z_{i2,t}(2), \ldots, z_{ik,t}(k)\}$ is the set of all measurements originating from contour t. The individual measurements $z_i(k)$ are obtained from the output of an edge extraction stage applied to original image.

New hypotheses are formed by associating each measurement as 1. belonging to a previously known contour.

That is, the measurement $z_i(k)$ is determined to correspond to a known contour in our current model. Determination of correspondences is achieved using the validation gate procedure outlined in a paper entitled, "Maintaining representations of the environment of a mobile robot" IEEE Trans. Robotics and Automation 5(6): 804-819, 1989.

If a measurement falls outside of the validation gates of all known/modeled contours then it is either 2. a new contour or
3. a false alarm.

In addition, for contours that are not assigned measurements, we also have the possibility of 4. termination of a contour This situation arises when we come to the end of a contour.

We define a particular global hypothesis at row k by $\theta_m^k$. Let $\theta_{l(m)}^{k-1}$ denote the parent hypothesis from which $\theta_m^k$ is derived, and $\theta_m(k)$ denote the hypothesis that indicates the specific status of all contours postulated by $\theta_{l(m)}^{k-1}$ at row k and the specific origin of all measurements received at row k.

Let T denote the total number of contours postulated by the parent hypothesis $\theta_{l(m)}^{k-1}$. Next, we define the event $\theta_m(k)$ based on the current measurements to consist of:

$\tau$ measurements from known contours
$\nu$ measurements from new contours
$\phi$ false alarms and
X terminated (or ended) contours from the parent hypothesis For all the current measurements, $z_i(k)$, $i=1,\ldots,m_k$ we define the indicator variables $$\tau_i \stackrel{\Delta}{=} \begin{cases} 1 & z_i(k) \text{ came from a known contour} \\ 0 & \text{otherwise} \end{cases} \quad (2)$$

$$\nu_i \stackrel{\Delta}{=} \begin{cases} 1 & z_i(k) \text{ is a new contour} \\ 0 & \text{otherwise} \end{cases} \quad (3)$$

$$\delta_t \stackrel{\Delta}{=} \begin{cases} 1 & \text{if contour } \tau(\text{in } \theta_{l(m)}^{k-1}) \text{ is detected at row } k \\ 0 & \text{otherwise} \end{cases} \quad (4)$$

$$X_t \stackrel{\Delta}{=} \begin{cases} 1 & \text{if contour } t(\text{in } \theta_{l(m)}^{k-1}) \text{is deleted at row } k \\ 0 & \text{otherwise} \end{cases} \quad (5)$$

From these definitions it holds that the number of edgels in the current event originating from existing contours is $$\tau = \sum_{i=1}^{m_k} \tau_i \quad (6)$$

the number of new contours is $$\nu = \sum_{i=1}^{m_k} \nu_i \quad (7)$$

and the number of false alarms is $$\phi = m_k - \tau - \nu \quad (8)$$

The number of terminated contours is $$X = \sum_{t=1}^{T} X_t \quad (9)$$

Figure 2:
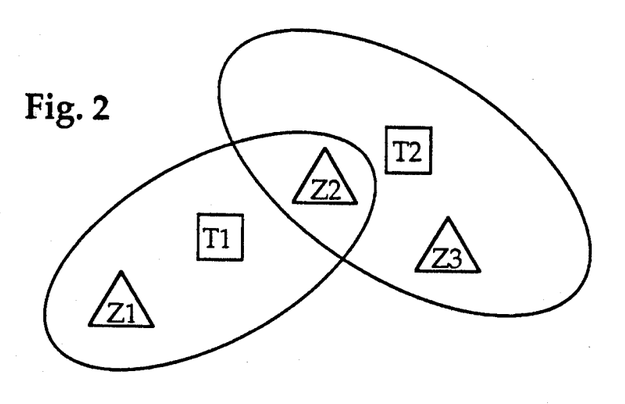
FIG. 2 depicts a situation involving several predicted target locations and elliptical validation regions for the case of two known contours ($T_1$ and $T_2$).

We can construct a set of events $\theta_m(k)$ by first creating a hypothesis matrix in which known contours are represented by the columns of the matrix and the current measurements by the rows. A non-zero element at matrix position $c_{i,j}$ denotes that measurement $z_i(k)$ is contained in the validation region of contour $t_j$. In addition to the T known contours in the world model the hypothesis matrix has appended to it a column 0 denoting false alarms and a column N+1 denoting new contour. FIG. (2) depicts a situation in which we have two known contours ($T_1$ and $T_2$) and three new measurements ($z_1(k)$, $z_2(k)$ and $z_3(k)$). This situation is represented by the hypothesis matrix $$\Omega = \begin{pmatrix} T_F & T_1 & T_2 & T_N \\ 1 & 1 & 0 & 1 \\ 1 & 1 & 1 & 1 \\ 1 & 0 & 1 & 1 \end{pmatrix} \begin{matrix} z_1(k) \\ z_2(k) \\ z_3(k) \end{matrix}$$

Hypothesis generation is then performed by picking one unit per row and one unit per column except for columns $T_F$ and $T_N$, where the number of false alarms and new targets is not restricted. This procedure assumes that the following two conditions are met (the so-called no-split/no-merge assumption).

1. a measurement has only one source and
2. a contour has at most one associated edgel per row We may relax these conditions further along.

The new hypothesis at row k, $\theta_m^k$ is made up of the current event and a previous hypothesis based on measurements up to and including row k-1, i.e.

$$\theta_m^k = \{\theta_{l(m)}^{k-1}, \theta_m(k)\} \quad (10)$$

We need to calculate the probability of such a hypothesis, i.e.

$$P\{\theta_m^k | Z^k\} \quad (11)$$

where $Z^k$ denotes all measurements up to and including row k. Using Bayes' rule we have $$P\{\theta_m^k | Z^k\} = P\{\theta_m(k), \theta_{l(m)}^{k-1} | Z(k), Z^{k-1}\} \quad (12)$$
$$= \frac{1}{c} p[Z(k)|\theta_m(k),\theta_{l(m)}^{k-1},Z^{k-1}]P\{\theta_m(k)|\theta_{l(m)}^{k-1},Z^{k-1}\}P\theta_{l(m)}^{k-1}|Z^{k-1}\}$$

The last term of this equation, $P\{\theta_{l(m)}^{k-1}|Z^{k-1}\}$, represents the probability of the parent global hypothesis and is therefore available from the previous scan. The remaining two terms may be evaluated as follows.

The second factor of Equation (12) yields $$P\{\theta_m(k)|\theta_{l(m)}^{k-1},Z^{k-1}\} = \quad (13)$$

$$\frac{\phi!\nu!}{m_k!} \mu_F(\phi)\mu_N(\nu) \prod_t (P_D^t)^{\delta_t}(1-P_D^t)^{1-\delta_t}(P_\chi^t)^{X_t}(1-P_\chi^t)^{1-X_t}$$

where c is a normalization constant, $\mu_F(\phi)$ ans $\mu_N(\nu)$ are the prior PMFs of the number of false measurements and new contours, and $P_D{}^t$ and $P_X{}^t$ are the probabilities of detection and termination (deletion) of contour.

To determine the first term on the right hand side of Equation (12) we assume that a measurement $Z_i(k)$ has a Gaussian probability density function (PDF)

$$N_{ti} = N[Z_i(k)] = N[Z_i(k):Z_i(k|k-1),S^{ti}(k)]$$
$$= |2\pi S^{ti}(k)|^{-\frac{1}{2}} e^{-\frac{1}{2}\{(Z(k)-Z_i(k|k-1))^T(S_{ti}(k))^{-1}(Z_{(k)}-Z_i(k|k-1))\}} \quad (14)$$

if it is associated with contour $t_i$, where $Z_i(k|k-1)$ denotes the predicted measurement for contour $t_i$ and $S^{ti}(k)$ is the associated innovation covariance. The prediction $Z_i(k|k-1)$ and innovation covariance $S^{ti}$ are precisely what is calculated using the (extended) Kalman filter. Therefore, each contour is modeled by a Kalman filter; the filter's state variables are the parameters of the curve, e.g. for a straight line we have a Kalman filter with two state variables. By increasing the filter's process noise, we are able to follow increasingly larger deviations of the contour from its assumed ideal shape. Perceptually relevant groupings of measurements have typically been based on rules such as "if they are close together, similar to one another, form a closed contour or move in the same direction". However, while such rules seem intuitively satisfying, there has been little work in quantifying such concepts. The Kalman filter provides explicit quantification of concepts such as "close together" or "moving in the same direction" by testing whether a new measurement falls inside the filter's validation region. The Kalman filter provides a tool for handling the measurement uncertainty due to noise, representing this as a covariance matrix, while the Bayesian hypothesis tree provides a tool for dealing with the data association problem.

If the measurement is a false alarm, then its PDF is assumed uniform in the observation volume, i.e. $V^{-1}$. V equals the number of pixels in a row. The probability of a new contour is also taken to be uniform with PDF $V^{-1}$. Under these assumptions, we have that $$p[Z(k)|\theta_m(k),\theta_{l(m)}^{k-1}, Z^{k-1}] = \quad (15)$$

$$\prod_{i=1}^{m_k} [N_{ti}[z_i(k)]]^{\tau_i} V^{-(1-\tau_i)} = V^{-\phi-\nu} \prod_{i=1}^{m_k} [N_{ti}[z_i(k)]]^{\tau_i}$$

Substituting Equations (15) and (13) into Equation (12) yields the final expression for the conditional probability of an association hypothesis $$P\{\phi_m{}^k|Z^k\} = \quad (16)$$

$$\frac{1\Phi!\nu!}{cm_k!} \mu_F(\phi)\mu_N(\nu) V^{-\phi-\nu} \prod_{i=1}^{m_k} [N_{ti}[z_i(k)]]^{\tau_i} \left\{ \prod_t (P_D{}^t)^{\delta_t}(1 - P_D{}^t)^{1-\delta_t}(P_X{}^t)^{X_t}(1 - P_X{}^t)^{1-X_t} \right\} P\{\theta_{l(m)}^{k-1}|Z^{k-1}\}$$

Ideally, if a complete Bayesian hypothesis tree could be grown, then the leaf with the largest probability would represent the most likely set of data associations, i.e. grouping of edge elements into contours. However, the Bayesian hypothesis tree grows exponentially with the number of measurements, so, in practice, the tree must be pruned. This is done by pruning branches of the tree that have low probability and by partitioning the single global hypothesis tree into spatially disjoint trees. These implementation procedures will be discussed in detail.

Further reduction in the size of the hypothesis trees is achievable by not considering all possible permutations, i.e. do not generate very unlikely hypotheses. For example, do not consider the possibility of false alarms or new targets if the corresponding measurement is matched to only one target and this target has no other measurements matched to it. Similarly, we only consider the possibility of track termination if the corresponding track has no measurements associated with it at any given interval.

Figure 3:
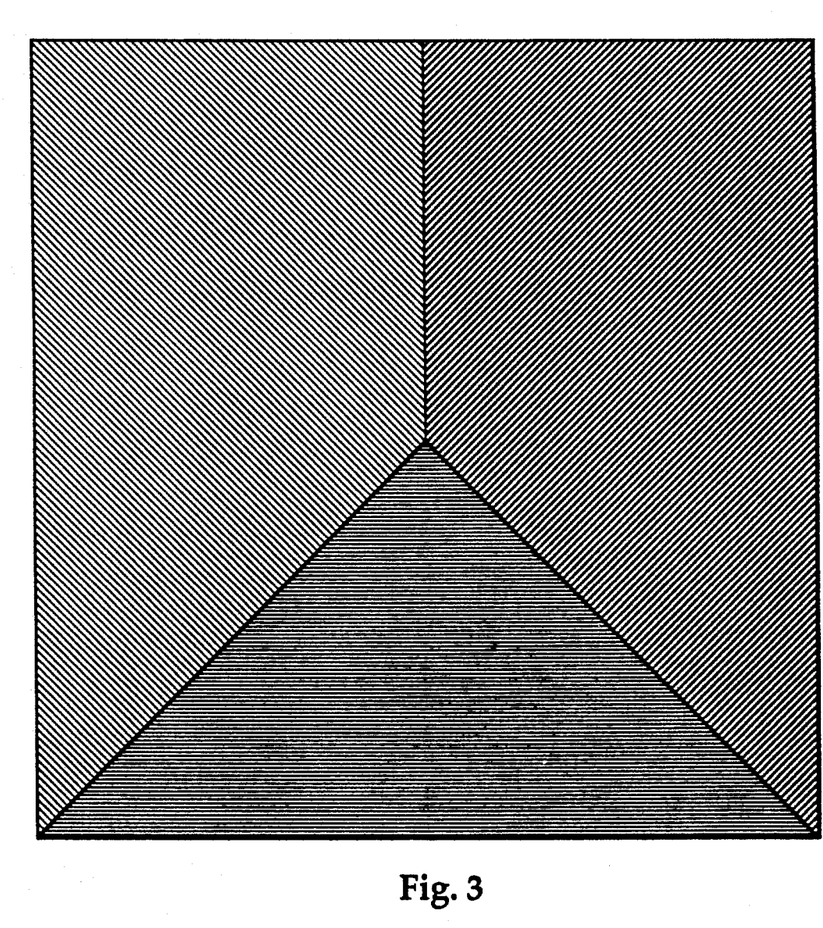
FIG. 3 is a simple test image.
Figure 4:
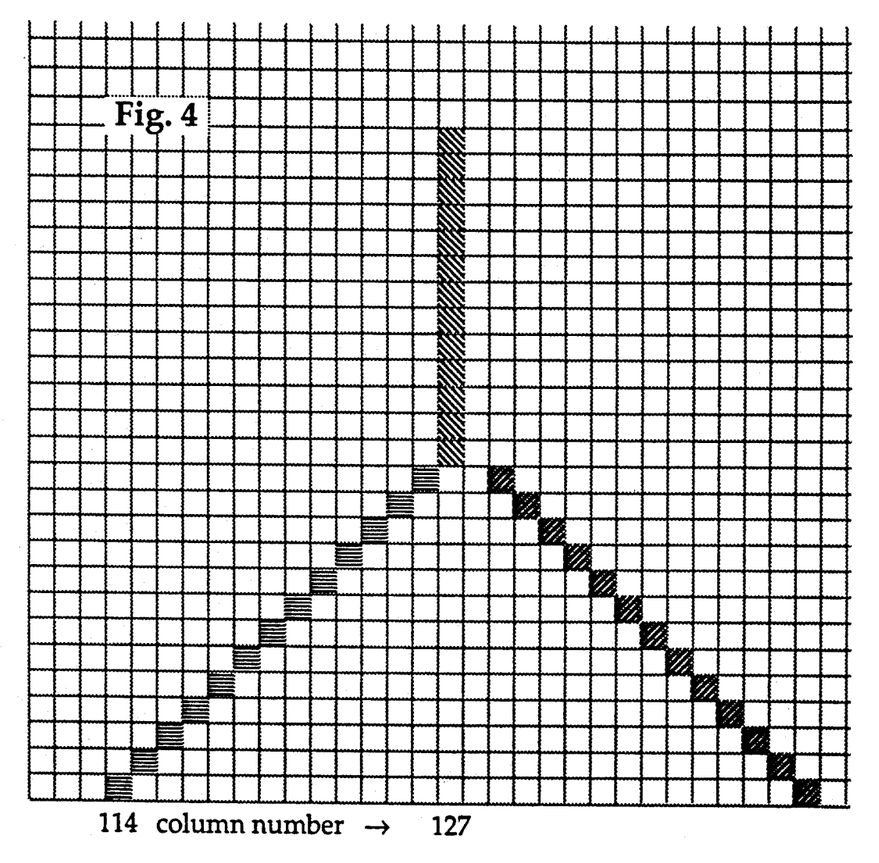
FIG. 4 shows the edge detector output corresponding to the image of FIG. 3 in the vicinity of the intersection.

FIG. 3 is a simple test image. FIG. 4 shows the edge detector output applied to this image in the vicinity of the intersection. The underlying Kalman filters associated with each contour assume constant gradient contours, i.e. straight lines, and the assumed process noise is 0.1. Note that fairly arbitrarily shaped contours can be tracked by increasing the process noise. The measurement vector for an edgel consists of two components, the location of the edgel along the row and an estimate of the gradient of the edge at that point. The gradient estimate is currently quantized to one of four directions; horizontal vertical and the two diagonals. For validation of measurements a gamma of 4 was used, i.e. a confidence level of 0.865.

Figure 5:
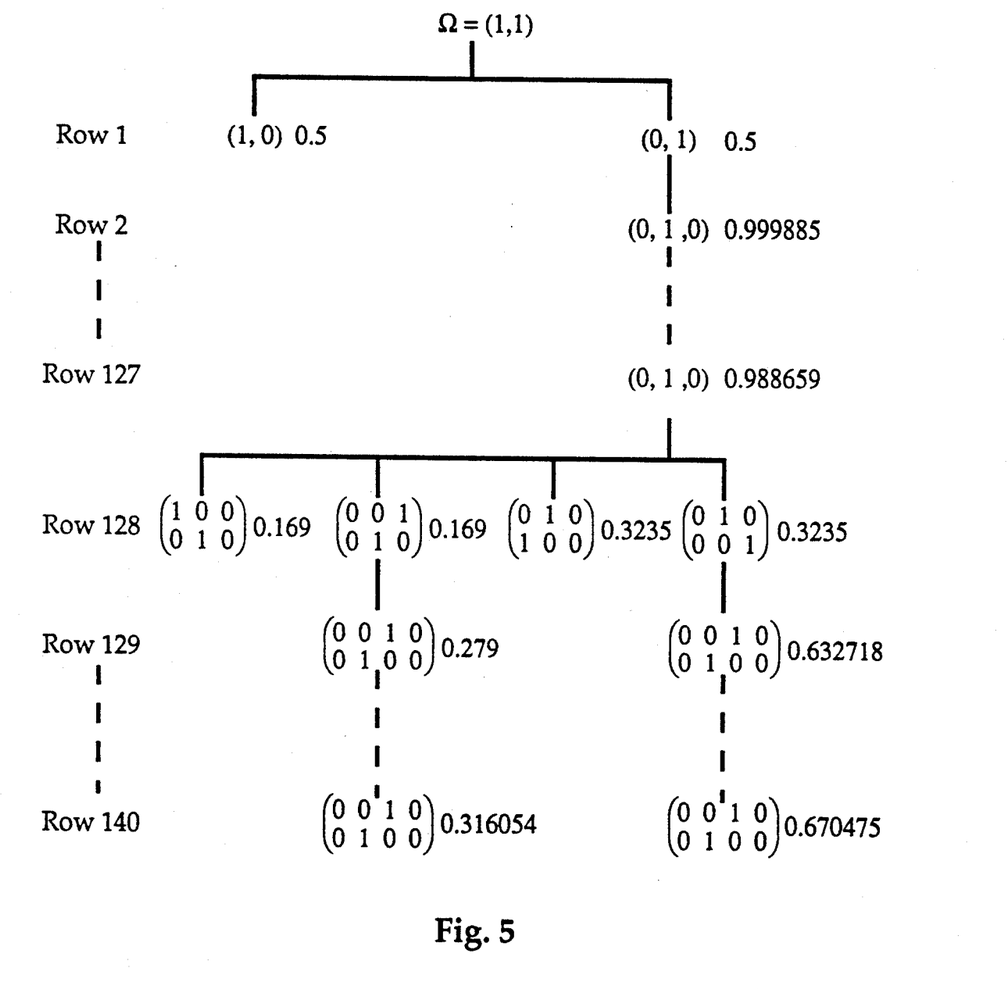
FIG. 5 shows a hypothesis tree and associated probabilities.
Figure 6A:
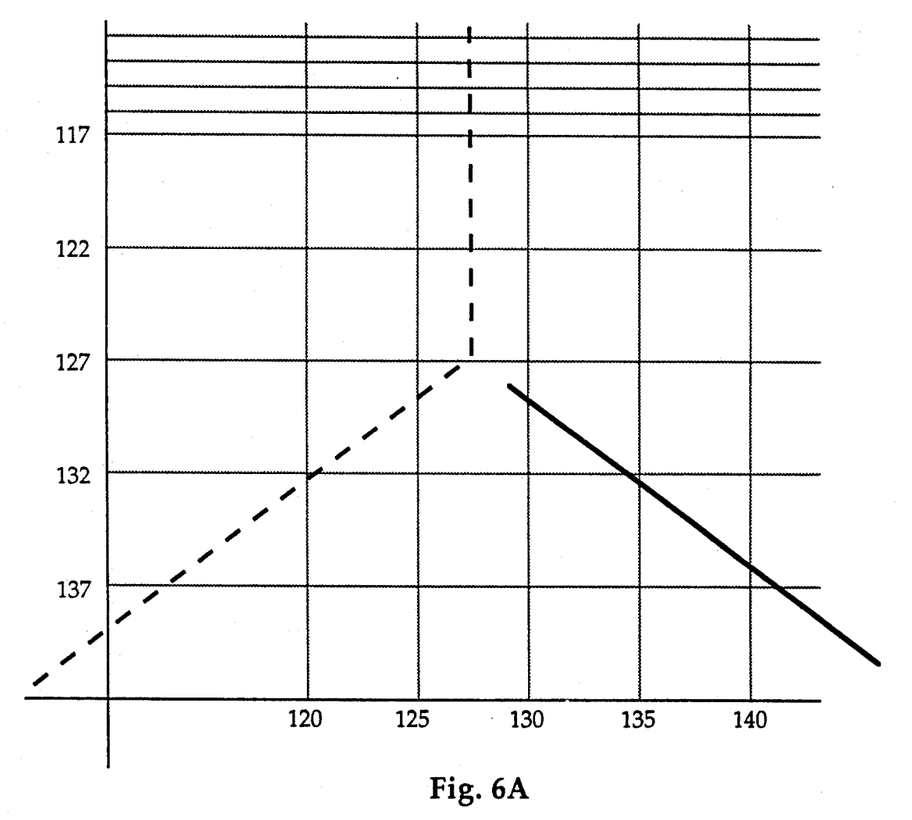
FIGS. 6a and 6b depicts the two highest probability partition of edgels into two contours.
Figure 6B:
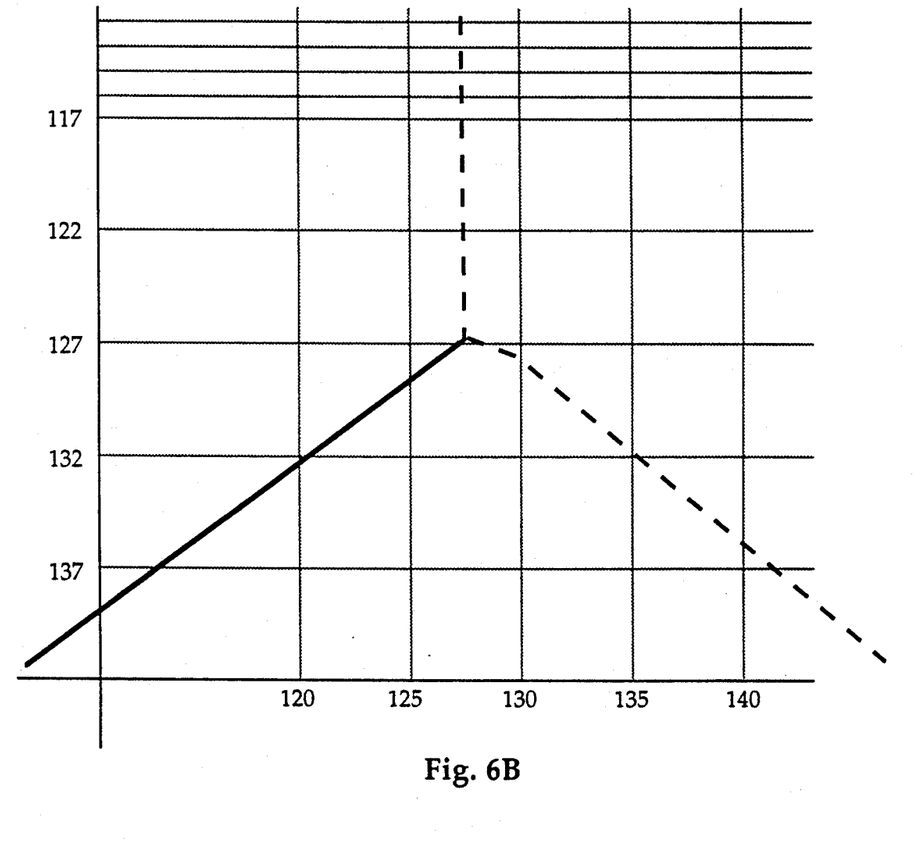

FIG. 5 illustrates the hypothesis tree that is grown in the interpretation of the image. A single measurement at row 1 is categorized as either a false alarm or new target. At row 2 the supporting measurement quickly increases the probability of a new contour to 0.9999.

Later, at row 127 two measurements or edgels are found in the contours's validation gate. The multiple hypotheses that were generated shown in FIG. 5 quickly resolve themselves into two principal interpretations as illustrated in FIGS. 5a and 5b. FIG. 5a shows the most likely interpretation (with probability 0.67) to be that the vertical contour carries on to the left while a new contour begins on the right. The second hypothesis (probability 0.32) shown in FIG. 5b has the vertical contour carrying on to the right with a new contour starting on the left.

These examples are very simple, serving mainly to illustrate the general workings of the algorithm. It should also be noted that the algorithm not only provides possible groupings of edgels with contours, but also an associated probability of such grouping note that such probabilities are associated with an entire hypothesis, i.e. a collection of contours. If the probability of a single contour is desired, this can be calculated by summing the probabilities of all the hypotheses that contain this contour. Finally, by traversing the hypothesis tree, it is straight forward to determine the locations where contours terminate and intersect.

Linking edgels to form contours is a difficult problem that requires confronting the dual uncertainties associated with the values and origins of edgel measurements. In accordance with the invention we achieve this within the Bayesian framework of a multiple hypothesis (tracking) filter.

The primary advantage of the MHT is that it postpones making irrevocable decisions. Instead, when ambiguities arise, each possible interpretation or hypothesis is generated and its associated probability calculated. Subsequent measurements are then applied with each hypothesis. Integration of edgel measurements over rows in the image resolves many (hopefully all) past ambiguities.

Consequently, at any row in the image we have multiple models, each one representing a possible interpretation of all past and current edgel measurements and each having an associated probability. If desired, a single unified model can be constructed by integrating all of the hypotheses to form a single hypothesis. Each contour within this single model then has an associated probability.

Thus, for each contour, there is an associated covariance matrix that models the uncertainty in the state estimate, for example, the state vector for a straight line would contain estimates of the gradient and position of a point on the line, due to measurement noise and an associated porbability that models the uncertainty in associating a particular set of edge elements with the contour. The two uncertainty measures are distinguishing features of this approach that should allow for more robust interpretation and integration by later processing modules.

This approach would quickly become infeasible if the hypothesis tree is not adequately pruned. The algorithm should not only correctly partition edgels into contours, but also detect contour termination and intersection points, key features of preattentive vision. In the specific example described, there has been ignored the possibility of horizontal contours. When this possibility cannot be ignored, a two pass scheme can be used in which the scene is first scanned a row at a time ignoring horizontal contours as was done here, and then scanned a column at a time ignoring verticle contours. Then the outputs of the two scans would be integrated to provide a complete description of the contours of the scene.

Alternatively, we could "follow" contours.

Further, the algorithm is readily extendable to dynamic vision and the tracking of contours over multiple frames.

Figure 1:
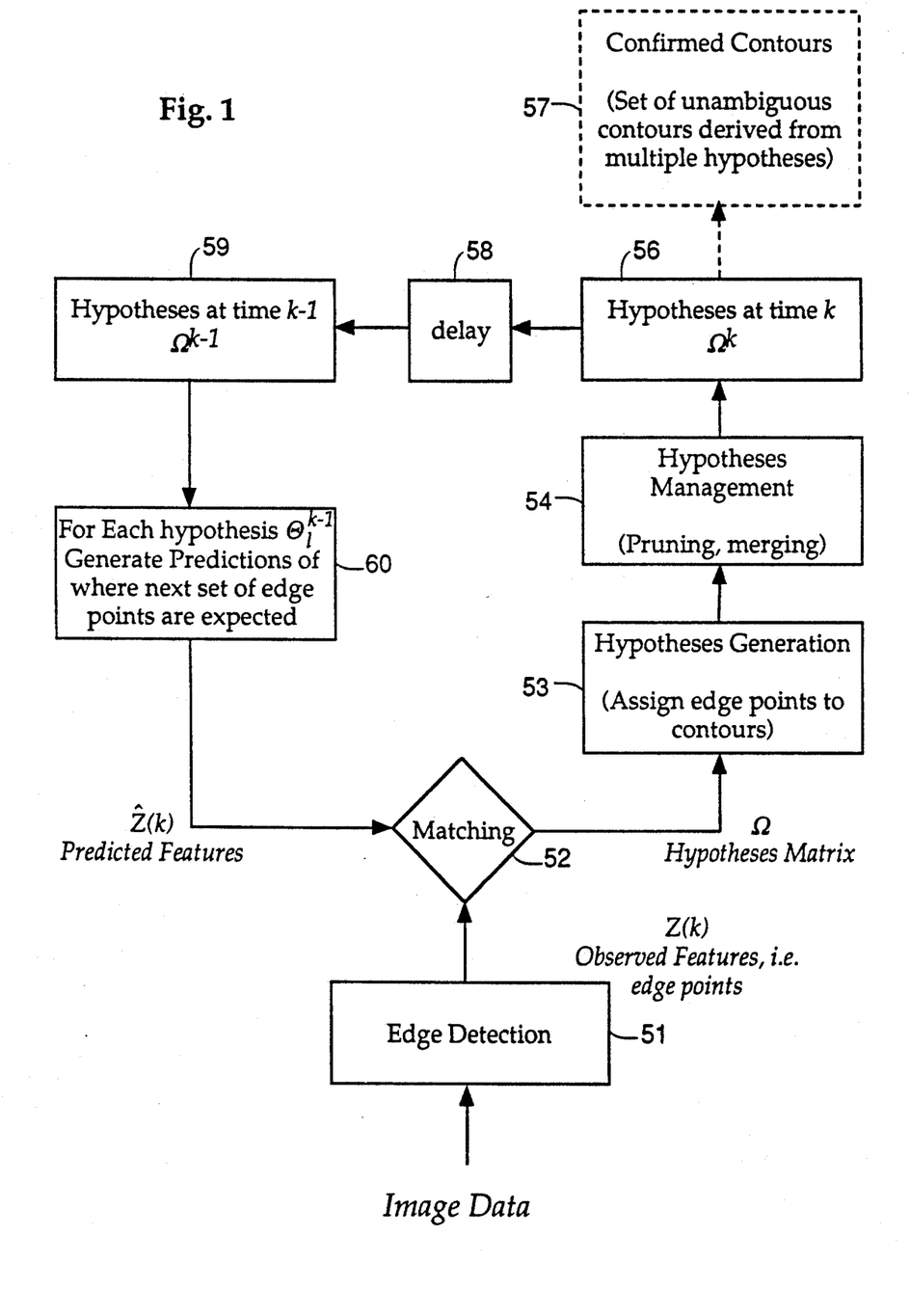

With the foregoing as background, we can now return to the drawing where FIG. 1 illustrates in block schematic form the basic elements useful for carrying out the contour embodiment of the inventive algorithm.

Typically, the image scene to be examined for contours is first transformed into an electrical signal by a suitable transducer, such as a CCD camera, and the electrical signal is then stored in a suitable storage medium as image data. As indicated by block 51, this image data is thereafter analyzed by an edge detection process for delineating discrete areas of the image scene that include contours to be detected. This is done in known fashion. Typically as an area with a contour is detected, a local neighborhood of such area is scanned, or the entire frame is scanned row or column at a time, for observing edgels in this neighborhood. After an initial edgel has been found and suitably stored for use in the prediction of expected edgels in the neighborhood, subsequent edgels observed are matched with the predicted edgels in the neighborhood, as indicated by block 52, and therefrom a hypothesis matrix for a contour based on edgels observed and predicted. Then, as indicated by block 53, newly observed edgels in the hypothesis matrix are assigned to contours and there are generated data association hypotheses based on the hypothesis matrix and probability statistics are provided to each hypothesis generated as previously discussed. Next, as indicated by block 53 for hypothesis management, there are summed the probability statistics for each hypothesis generated over several time steps, as previously discussed, for discarding the hypotheses with relatively low probability statistics and saving for utilization and storage the hypotheses with relatively high probability statistics, while simultaneously further reducing the number of hypotheses by partitioning the hypotheses trees into spatially disjoint trees for providing a new set of hypotheses, as indicated by block 56, for providing a set of unambiguous contours derived from multiple hypotheses, useful for providing confirmed contours, as indicated by block 57. The new set of hypotheses, after delay of one time step introduced by delay 58, becomes available as indicated by block 59, for generating predictions of where the next set of edgels are expected, as indicated by block 60, for use in the matching process, earlier described, indicated by block 52.

With minor adjustments, the algorithm described may be adopted to the embodiment for segmenting an image scene into regions of uniform or other prescribed intensity distribution. In such an embodiment, the image data is supplied to detection means that scan local neighborhoods for an initially small region of pixels that have the desired intensity distribution and thereafter finding the limits of such region in a manner analogous to that used for finding contours.

What is claimed is:

1. A computer vision process for finding at least one contour in an image scene comprising the steps of,
   a) storing a frame of the image scene,
   b) analyzing said frame by an edge detection process for delineating points of said image scene that are points of high intensity gradient that are to be partitioned into disjoint contours,
   c) scanning a local neighborhood of said points for observing edgels in said neighborhood,
   d) matching the observed edgels for a neighborhood with predicted edgels for said neighborhood for a hypothesis for a contour based on edgels observed or predicted for said neighborhood, said predicted edgels being based on earlier observed and predicted edgels for adjacent edgels in the local neighborhood,
   e) generating data association hypotheses based on the hypothesis matrix that assign specific edgels to specific contours and deriving a hypothesis tree,
   f) by discarding hypotheses that have relatively low probability and retaining hypotheses that have relatively high probability, reducing the total number of hypotheses and partitioning the hypothesis tree into spatially disjoint trees,
   g) utilizing the saved hypothesis for predicting edgels for the next neighborhood for use in the earlier-mentioned step of matching, and
   repeating steps d-g until a desired contour has been delineated.

2. A computer vision process for partitioning an image scene into disjoint sets of points based on a method of probabilistic data association, particularly, a computer vision process for segmenting an image into at least one spatially disjoint region comprising the steps of storing a frame of an image scene, scanning a local neighborhood of said scene for observing edgels in said neighborhood, matching the observed edgels for a neighborhood with predicted edgels values for said neighborhood for developing a hypothesis matrix for a region based on edgels observed or predicted for that neighborhood, said predicted edgels being based on earlier observed and predicted values, assigning newly observed edgels in said hypothesis matrix to regions, generating data association hypotheses based on the hypothesis matrix that assigns specific edgels to the partition of an image scene into spatially disjoint regions, providing probability statistics to each hypothesis generated, summing the probability statistics of each hypothesis and discarding hypotheses with relatively low probability statistics while saving for utilization and for storage the hypotheses with relatively high probability statistics, reducing the total number of hypotheses by partitioning the hypotheses tree into spatially disjoint trees, and utilizing the saved hypotheses for generating predicted edgel values for the next neighborhood for use in the earlier-mentioned matching, repeating the processing until the desired partitioning of the image scene has been delineated.

* * * * *